No. 681,657. Patented Aug. 27, 1901.
W. L. PORTER & R. WITTKE.
TIPPING MACHINE.
(Application filed Feb. 16, 1900.)
(No Model.) 2 Sheets—Sheet 1.

Witnesses.
Inventors.
William L. Porter
Robert Wittke
By Benedict & Morsell
Attorneys.

No. 681,657. Patented Aug. 27, 1901.
W. L. PORTER & R. WITTKE.
TIPPING MACHINE.
(Application filed Feb. 16, 1900.)
(No Model.) 2 Sheets—Sheet 2.

Witnesses.
O. N. Keeney.
Anna V. Faust.

Inventors.
William L. Porter
Robert Wittke
By Benedict and Morsell
Attorneys.

United States Patent Office.

WILLIAM L. PORTER AND ROBERT WITTKE, OF OCONTO, WISCONSIN; SAID PORTER ASSIGNOR TO ROBERT M. KYLE AND NEIL J. KYLE, OF CHICAGO, ILLINOIS.

TIPPING-MACHINE.

SPECIFICATION forming part of Letters Patent No. 681,657, dated August 27, 1901.

Application filed February 16, 1900. Serial No. 5,414. (No model.)

*To all whom it may concern:*

Be it known that we, WILLIAM L. PORTER and ROBERT WITTKE, of Oconto, in the county of Oconto and State of Wisconsin, have invented a new and useful Improvement in Tipping-Machines, of which the following is a description, reference being had to the accompanying drawings, which are a part of this specification.

Our invention has relation to improvements in tipping-machines or machines for soldering the center hole of a can-cap.

The primary object had in view is to provide for effecting the tipping operation automatically, the invention being of such character that a greater amount of work can be accomplished in less time, with more uniformity and with less solder, than can be done by hand in the old way.

With the above primary object and other incidental objects in view the invention consists of the devices and parts or their equivalents, as hereinafter set forth.

Figure 1:
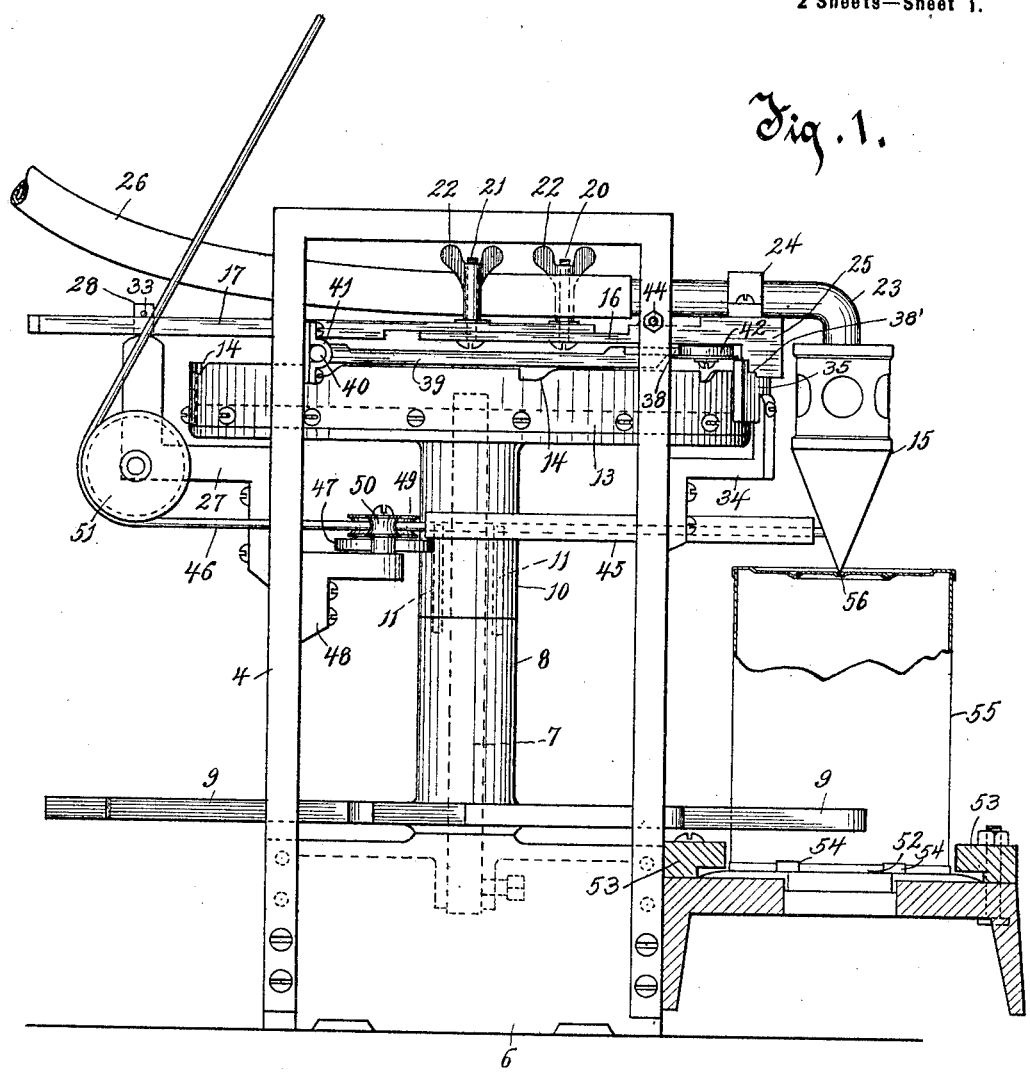
Figure 3:
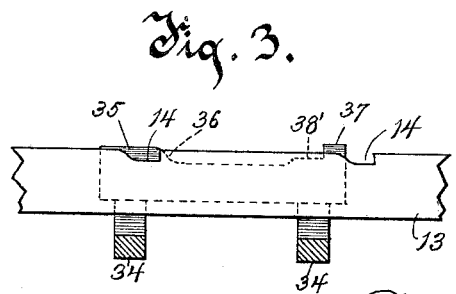
Figure 2:
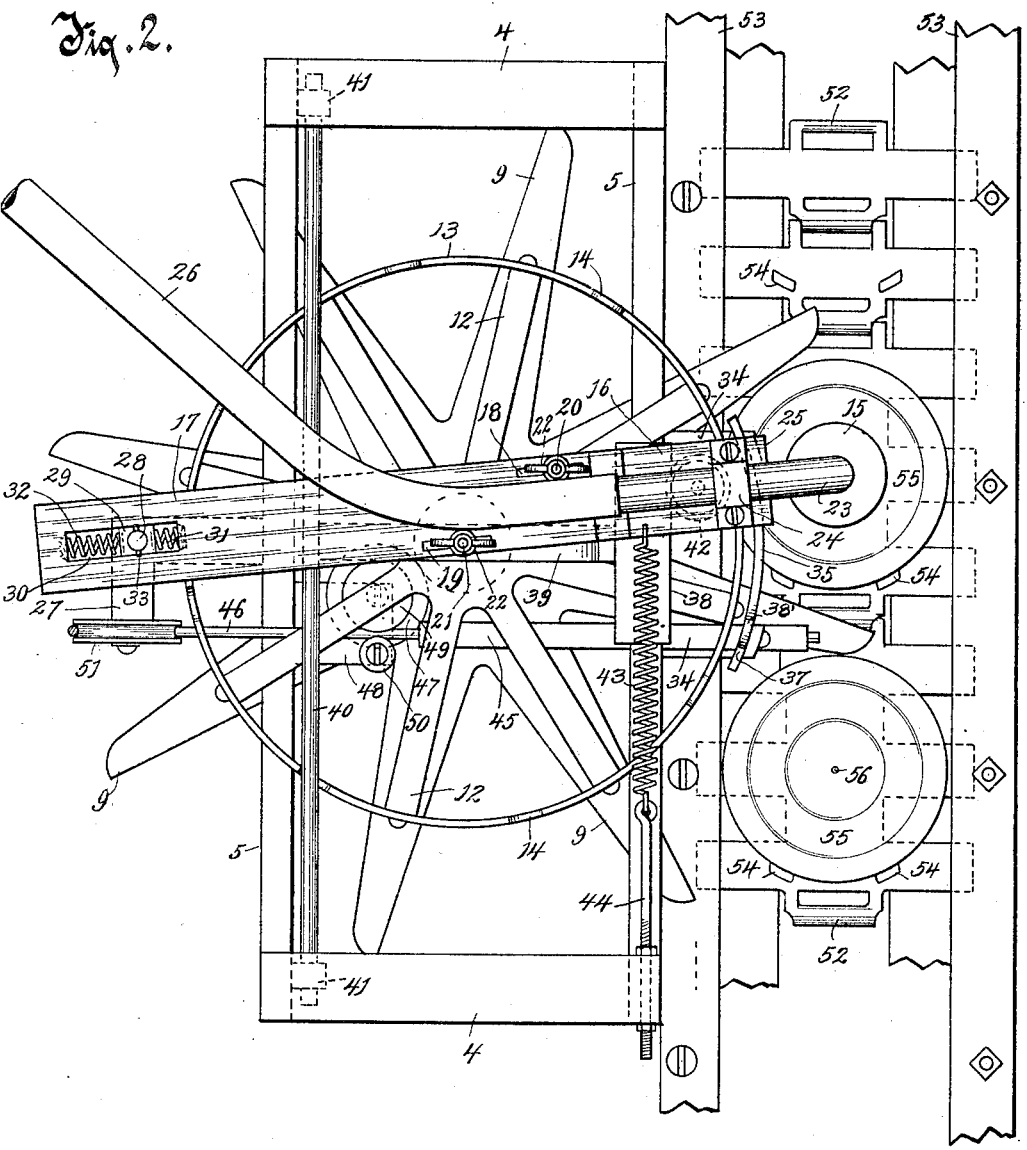

In the accompanying drawings, Figure 1 is an end view of the machine, showing the front thereof arranged adjacent to an endless conveyer of a capping-machine. Fig. 2 is a plan view of Fig. 1, and Fig. 3 is a detail view showing a fragment of the notched band and the short metallic strap adjacent thereto.

The frame of the machine may be of any desirable construction, but is preferably of the form of construction shown in the accompanying drawings, wherein it is composed of two inverted-U-shaped end pieces 4 4, connecting-beams 5 5, and a base portion 6. This base-piece carries an upright shaft 7. Adapted to revolve on the lower half of the shaft is a hub 8, having a plurality of arms 9 projecting therefrom, advisably from the lower end thereof and preferably eight in number. An upper hub 10 also surrounds the shaft 7 and is secured to the lower hub by means of dowel-pins 11, so as to revolve with said lower hub. If desired, of course, the two hub portions could be made integral. Arms 12, preferably eight in number, also radiate from the upper hub portion and are connected at their outer ends by an annular band 13. This band has a plurality of notches 14 in its upper edge, preferably eight in number, and arranged equidistant apart.

The numeral 15 indicates a soldering or tipping iron of the usual and well-known form of construction. This iron is carried by a longitudinally-adjustable carriage. In order to provide for the longitudinal adjustment, the said carriage is preferably composed of a forward portion 16 and a rear portion 17. The forward portion is cut away on its upper side at a desirable point from its forward end to form a reduced rear portion extending to its rear extremity, and the rear member 17 is cut away on its lower side at a desirable distance from its rear end and extending to its forward extremity. The two members 16 and 17 are provided with registering elongated slots 18 and 19, through which screw-bolts 20 and 21 pass, the heads of said bolts bearing against the under side of the member 16 and the threaded portions of said bolts which extend above the member 17 having nuts 22 22, turning thereon and bearing with sufficient friction against the rear section 17 to hold the two sections of the carriage together. The nuts are advisably provided with wings for convenience in turning the same. By making the carriage of two sections adjustably connected together the length of the carriage may be properly and accurately adjusted at any time so as to bring the soldering-iron in proper position with relation to the can and also the head of the carriage in proper relation to the band 13 and to the other parts with which it coacts. From the top of the soldering-iron extends an angular pipe 23, which passes through an inverted-U-shaped strap 24, bolted to the outer head portion 25 of the forward section 16 of the carriage. To the rear end of this pipe 23 is connected a rubber hose or tubing 26, leading from any suitable source of supply and adapted for carrying air and gas to the soldering-iron.

The numeral 27 indicates an angular bracket or arm secured to the framework. The upper end of this arm is provided with a reduced pivot or journal-stud 28, to which is fitted a bearing-box 29, said bearing-box fitting in an elongated slot 30 in the rear of the section 17 of the carriage. Arranged within the elongated slot on opposite sides of the bearing-box and pressing against said bearing-box are coiled springs 31 and 32. The carriage is adapted to swing in a horizontal plane on the stud 28 and is also adapted to have a slight vertical swing or rocking motion, the portion of the arm 27 from which the stud projects and on which the section 17 rests being rounded, as clearly shown in Fig. 1, so as to provide for this vertical rocking motion. A pin 33 intersects the stud 28 near the upper end of said stud and at a point sufficiently high to permit the slight vertical play of the carriage, the said pin serving to hold the section 17 of the carriage in engagement with the stud during the vertical rocking motion of the carriage. The outer head portion 25 of the carriage is adapted to be engaged by one of the notches 14 of the band 13, as hereinafter explained. Extending from the front connecting-beam 5 of the frame are angular brackets or arms 34, and these arms have secured to their upper ends a short strap 35, said strap being arranged alongside of the annular band 13 and provided at one end with an elevation 36 and with a square projection 37 at its other end, forming a stop, and an elevation 38' of less height than the elevation 36 and arranged just in advance of the stop 37.

The numeral 38 indicates a straight track which throughout its length is on a plane parallel with the center of a can. This track is carried at the forward end of a straight stem 39, and the rear end of said stem 39 connects with a rod 40, which extends the length of the rear portion of the machine and is journaled in suitable bearings 41 41, said bearings adapting the rod 40 to turn therein and thereby permitting a vertical movement of the track. On the under side of the section 16 of the carriage, just to the rear of the head portion 25 thereof, is mounted a wheel 42, said wheel bearing against the track 38 and provided at its lower edge with an annular flange which extends beneath the said track. A coiled spring 43 is connected at its inner end to the forward section 16 of the carriage and at its outer end to an adjustable rod 44. Secured to the frame is a short piece of pipe 45, the forward end of said pipe extending close to the path of movement of the soldering-iron 15.

The numeral 46 indicates a length of wire-solder which is fed through the short pipe 45. For the purpose of properly feeding this wire-solder we provide a friction-wheel 47, which is mounted on a pivot extending from an angular bracket 48. This friction-wheel is in contact with and derives its rotation from the upper hub-section 10. On the upper end of the stud of the friction-wheel is carried a grooved wheel 49, the groove of said wheel receiving the wire-solder 46. There is also a small opposed grooved wheel 50, which, in conjunction with the grooved wheel 49, serves to feed the solder forwardly through the pipe 45. In order to provide for guiding the wire-solder from the source of supply, it is preferably passed around a guide-roller 51, mounted at the angle of the bracket or arm 27.

The numeral 52 indicates an endless carrying chain or conveyer which forms a part of a capping-machine, the said conveyer running in suitable side or guide rails 53 53. Every third link of the chain is provided with lugs 54 54, against which the cans 55 are set. Motion is imparted to the conveyer in the usual manner common in capping-machines.

In the operation of the invention as the endless conveyer travels and carries therewith the cans each can will act upon one of the arms 9 of the lower hub portion 8, and consequently rotate said hub portion and also the upper hub portion 10 therewith. This will cause the annular band 13 to be rotated and one of the notches 14 thereof to be brought into engagement with the head 25 of the carriage, the said carriage being thereby carried therewith, and consequently the soldering-iron also caused to travel with the carriage and at the same rate of speed that the can is traveling, thereby keeping the point of the soldering-iron in the center of the can and in register with the central opening 56 in the top of the can. As the carriage thus travels in a horizontal plane the roller 42 rides along the straight track 38, and consequently the carriage is made to travel in a rectilinear line notwithstanding the rotatorial movement of the band 13, the swinging motion imparted to the carriage by reason of its engagement with the band 13 being overcome by the provision of the movable bearing-box 29 in the slot 30, said bearing-box being acted upon by the springs 31 and 32, and hence said springs at the same time serve to hold the wheel 42 into contact with the track 38. It will be understood that as the carriage travels in the manner described, with the point of the soldering-iron registering with the central opening 56 in the can-top, the gas and air are fed through the rubber hose 26 and the pipe 23 into the soldering-iron and thence out of the conical discharge-opening of said iron, and by this means the wire-solder 46 is melted and caused to tip or solder the hole 56. In the movement of the carriage in a horizontal plane, as just described, the head 25 of said carriage is also moving over the edge of the short strap 35, and after the said carriage has moved a certain distance it will ride up the elevation 36 of said strap, and thereby raise the head of the carriage out of engagement with the notch 14. The moment it is thus raised out of engagement the spring 43, acting on the carriage, will cause said carriage to be swung toward and to its normal position and along the raised edge of the band 13 between two of the notches, the extent of swinging being limited by contact of the head of the carriage with the stop 37 at the opposite end of the strap 35. The carriage remains in this position until the next can acts on one of the arms 9. When the head of the carriage thus comes in contact with the stop 37, it will rest on the raised edge of the band 13, which is between two of the notches 14, and when the next notch of the band is brought around into register with the elevation or raised surface 38' said surface is low enough to permit the notch 14 to engage the head of the carriage and carry it off the elevation 38'; but said elevation also is high enough to hold the point of the soldering-iron free from contact with the cap of the can, and the point of said soldering-iron is thus held until the carriage is fully carried off of the elevation 38'. When this latter occurs, the point of the soldering-iron is again permitted to descend to the central hole 56 in the can-top and will continue in that position until the other elevation 36 again raises the carriage and releases it from the notch. It will be understood that the notches 14 are so spaced with relation to the elevation 38' that the carriage is not engaged by the notch of the band 13 until said band has first moved a slight distance. When so moved, the notch will engage and carry the carriage off the elevation 38', and at this time the can will have been advanced sufficiently far to bring the central opening thereof into register with the point of the soldering-iron. At this time, of course, the can, band, and carriage will move together in unison. The provision of the means for allowing a slight vertical rocking of the carriage permits the head of said carriage to ride up the inclines 36 and 38', and the provision of means for allowing the track 38 to swing vertically permit said track to be in line to be engaged by the roller 42 when the carriage swings vertically. This vertical swinging of the track is very slight, only amounting to about one-eighth of an inch. The down movement of the track is caused by the head 25 of the carriage dropping into the notches on the upper edge of the band 13, the weight of the carriage of course at this time forcing the track downwardly. When the carriage is carried the proper distance by a notch, the said carriage comes in contact with the incline on the strap 35 and is consequently raised, and as the carriage is thus raised the flange at the lower edge of the wheel 42 will necessarily raise the track. This flange also serves as a means for supporting the track.

What we claim as our invention is—

1. In a tipping-machine adapted to act in conjunction with can-conveying mechanism, said mechanism adapted to carry cans along in a longitudinal line, the said cans being arranged in an upright position on the conveying mechanism, with the caps of the cans uppermost, the combination of a carriage, a soldering-iron carried by said carriage, means for actuating the carriage so as to carry the soldering-iron along with a can, with the point of said soldering-iron in register with the opening in the can-cap, the iron being adapted to melt solder passing to the opening in the can-cap, and means, after the soldering operation has been completed, for returning the carriage to its initial position ready to be carried along with a succeeding can.

2. In a tipping-machine adapted to act in conjunction with can-conveying mechanism, said mechanism adapted to carry cans along in a longitudinal line, the said cans being arranged in an upright position thereon, with the caps thereof uppermost, the combination of a carriage, a soldering-iron carried by said carriage, means for automatically actuating the carriage so as to carry the soldering-iron along with a can, the point of said soldering-iron being in register with the opening in the can-cap, and the iron being adapted to melt solder supplied thereto, the said melted solder passing to the opening in the can-cap, and means, after the soldering operation is completed, for automatically returning the carriage to its initial position ready to be carried along with a succeeding can.

3. In a tipping-machine adapted to act in conjunction with can-conveying mechanism, said mechanism adapted to carry cans arranged thereon along in a longitudinal line, said cans being disposed on the conveying mechanism in an upright position with the caps thereof uppermost, the combination of a carriage, a soldering-iron carried by said carriage, means for actuating the carriage so as to carry the soldering-iron along with a can, the point of said soldering-iron being in register with the opening in the can-cap, and the iron being adapted to melt solder supplied thereto, the said melted solder passing to the opening in the can-cap, and a spring connected to the carriage and adapted, after the soldering operation is completed, to return said carriage to its initial position ready to be carried along with a succeeding can.

4. In a tipping-machine adapted to act in conjunction with can-conveying mechanism, the combination of a horizontally-swinging carriage carrying a soldering-iron, a device provided with means at certain distances apart for engaging the carriage and moving said carriage therewith, means for intermittently actuating said engaging device simultaneously with the movement of a can, the said carriage being carried with the engaging device, and the soldering-iron carried by the carriage having its point in register with the opening in the can-cap during the movement of the carriage, means for releasing the carriage from its engaging device, after the soldering operation is completed, and means, upon the release of the carriage, for returning said carriage to its initial position ready to be carried along with a succeeding can.

5. In a tipping-machine adapted to be used in conjunction with can-conveying mechanism, the combination of a horizontally-swinging and vertically-rocking carriage carrying a soldering-iron, an annular band provided therearound at desired distances apart with notches for engaging the carriage and moving said carriage therewith, means for intermittently rotating the band simultaneously with the movement of a can, a notch of the band being thereby caused to engage the carriage and carry said carriage therewith, the soldering-iron carried by the carriage having its point in register with the opening in the cap of the can during the movement of the carriage, means for causing the carriage to move in a rectilinear plane when thus actuated by the band, means for raising the carriage out of engagement with the notch, after the soldering operation is completed, and means adapted, upon the release of the carriage, to return said carriage to its initial position ready to be carried along with a succeeding can.

6. In a tipping-machine, the combination with a conveyer adapted to convey and carry cans, a movable carriage carrying a soldering-iron, a device provided with means at certain points for engaging the carriage and moving said carriage therewith, mechanism between said engaging device and the conveying mechanism for causing the engaging device to be intermittently actuated simultaneously with the movement of a can, said carriage being thereby carried with the engaging device, and the soldering-iron carried by the carriage having its point in register with the opening in the can-cap during the movement of the carriage, means for releasing the carriage from the engaging device after the soldering operation is completed, and means adapted, upon the release of the carriage, for returning said carriage to its initial position ready to be carried along with a succeeding can.

7. In a tipping-machine, the combination with a conveyer adapted to convey and carry cans, a rotatable device provided with arms adapted to be acted upon by the cans as said cans are moved, a carriage carrying a soldering-iron, an engaging device carried by the rotatable part, and provided with means at desired distances apart for engaging the carriage and moving said carriage therewith, and the soldering-iron carried by the carriage having its point in register with the opening in the can-cap during the movement of the carriage, means for releasing the carriage from the engaging device after the soldering operation is completed, and means adapted, upon the release of the carriage, for returning said carriage to its initial position ready to be carried along with a succeeding can.

8. In a tipping-machine, the combination with a conveyer adapted to convey and carry cans, a rotatable part provided with arms, said arms adapted to be acted upon by the cans in the movement of said cans and thereby cause a rotation of the rotatable part, a movable carriage carrying a soldering-iron, other arms projecting from the rotatable part and connected by a band, said band provided at certain distances apart with means for engaging the carriage and moving said carriage therewith, and the soldering-iron carried by the carriage having its point in register with the opening in the can-cap during the movement of the carriage, means for releasing the carriage from its engaging device after the soldering operation is completed, and means adapted, upon the release of the carriage, for returning said carriage to its initial position ready to be carried along with a succeeding can.

9. In a tipping-machine adapted to operate in conjunction with can-conveying mechanism, the combination of a swinging carriage carrying a soldering-iron, and also provided with a wheel, a track against which said wheel rotates, a rotatable part provided at certain distances apart with means for engaging the carriage and moving said carriage therewith and simultaneously with the movement of a can, and the soldering-iron carried by the carriage having its point in register with the opening in the can-cap during the movement of the carriage, means for releasing the carriage from its engaging device after the soldering operation is completed, and means adapted, upon the release of the carriage, for returning said carriage to its initial position ready to be carried along with a succeeding can.

10. In a tipping-machine adapted to act in conjunction with can-conveying mechanism, the combination, of a swinging carriage carrying a soldering-iron, a device provided with means, at certain distances apart, for engaging the carriage and moving said carriage therewith, means for intermittently actuating the engaging device simultaneously with the movement of the can, the said engaging device in its movement carrying the carriage therewith, and the soldering-iron carried by the carriage having its point in register with the opening in the can-cap during the movement of the carriage, a plate provided at one end with an elevation adapted to raise the carriage out of engagement with the engaging device, and said plate provided at its opposite end with a stop, and means adapted, upon the release of the carriage, for returning said carriage to its initial position to the limit permitted by the engagement of the carriage with the stop.

11. In a tipping-machine, adapted to act in conjunction with can-conveying mechanism, the combination, of a horizontally-swinging carriage carrying a soldering-iron, a device provided with means at certain distances apart for engaging the carriage and moving said carriage therewith, means for actuating said engaging device to cause the same to be intermittently actuated simultaneously with the movement of a can, the said carriage being carried with the device, and the soldering-iron carried by the carriage having its point in register with the opening in the can-cap during the movement of the carriage, a plate provided with an elevation adapted to raise the carriage out of engagement with the engaging device, said plate provided at its opposite end with another elevation of less height than the first-named elevation, and also provided with a stop, and means adapted, upon the release of the carriage, for returning the carriage to the limit permitted by contact of said carriage with the stop of the plate.

In testimony whereof we affix our signatures in presence of two witnesses.

WILLIAM L. PORTER.
ROBT. WITTKE.

Witnesses:
J. A. RAMSAY,
FRANK A. WATERS.